US008595503B2

(12) United States Patent
Ming

(10) Patent No.: US 8,595,503 B2
(45) Date of Patent: Nov. 26, 2013

(54) METHOD OF SELF-AUTHENTICATING A DOCUMENT WHILE PRESERVING CRITICAL CONTENT IN AUTHENTICATION DATA

(75) Inventor: Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1480 days.

(21) Appl. No.: 12/165,555

(22) Filed: Jun. 30, 2008

(65) Prior Publication Data

US 2009/0328143 A1    Dec. 31, 2009

(51) Int. Cl.
*G06F 21/00*    (2013.01)

(52) U.S. Cl.
USPC .......................................................... 713/176

(58) Field of Classification Search
USPC .......................................................... 713/176
See application file for complete search history.

(56) References Cited

U.S. PATENT DOCUMENTS

| | | | | |
|---|---|---|---|---|
| 5,517,614 | A * | 5/1996 | Tajima et al. ...................... | 714/1 |
| 6,170,744 | B1 * | 1/2001 | Lee et al. ...................... | 235/380 |
| 6,212,504 | B1 * | 4/2001 | Hayosh ........................... | 705/64 |
| 6,886,863 | B1 * | 5/2005 | Mowry et al. ................... | 283/72 |
| 2001/0034835 | A1 * | 10/2001 | Smith ............................. | 713/175 |
| 2002/0122568 | A1 * | 9/2002 | Zhao ............................... | 382/100 |
| 2003/0089764 | A1 * | 5/2003 | Meadow et al. .............. | 235/375 |
| 2003/0147549 | A1 | 8/2003 | Choi et al. | |
| 2003/0210802 | A1 * | 11/2003 | Schuessler .................... | 382/100 |
| 2007/0074029 | A1 * | 3/2007 | Yamamoto .................... | 713/176 |
| 2007/0204164 | A1 | 8/2007 | Cattrone et al. | |
| 2009/0141987 | A1 * | 6/2009 | McGarry et al. ............... | 382/218 |

FOREIGN PATENT DOCUMENTS

| | | |
|---|---|---|
| JP | H8-297743 | 11/1996 |
| JP | 2003-319170 | 11/2003 |
| JP | 2007-300602 | 11/2007 |
| JP | 2008-510327 | 4/2008 |
| WO | 2006009663 | 1/2006 |
| WO | 2007/127038 | 11/2007 |

OTHER PUBLICATIONS

Min Wu et al., "Data Hiding in Binary Image for Authentication and Annotation", Aug. 2004, IEEE Transactions on Multimedia vol. 6 No. 4 pp. 528-538—corrected.*
Japanese Office Action, dated Jul. 23, 2013, in a counterpart Japanese patent application, No. JP 2009-151809.
Low et al., "Fusion of LSB and DWT Biometric Watermarking for Offline Handwritten Signature", Proceedings of the First International Congress on Image and Signal Processing, May 2008, vol. 5, pp. 702-708.

* cited by examiner

*Primary Examiner* — Joseph P. Hirl
*Assistant Examiner* — John B King
(74) *Attorney, Agent, or Firm* — Chen Yoshimura LLP

(57) ABSTRACT

An improved document authentication method in which critical content, such as signatures, is preserved at a high-resolution in the authentication data carried on the self-authenticating document. When generating authentication data, signatures are compressed without down-sampling to preserve their resolution and quality. The compressed signature data (a bit string) is embedded in an image segment on the document. For example, each bit of the bit string is stored in the low bits of one or more image pixels. A hash code is calculated from the bit string and stored in a barcode printed on the document. To authenticate a scanned-back document, the bit string is recovered from the image segment. A hash code is calculated from the recovered bit string and compared to the hash code extracted from the barcode. The signatures re-generated from the recovered bit string are compared to the signatures in the scanned document.

22 Claims, 2 Drawing Sheets

METHOD OF SELF-AUTHENTICATING A DOCUMENT WHILE PRESERVING CRITICAL CONTENT IN AUTHENTICATION DATA

BACKGROUND OF THE INVENTION

1. Field of the Invention

This invention relates to a method of document self-authentication, and in particular, it relates to a method of document self-authentication that preserves critical content such as signatures on the document with high resolution in the authentication data.

2. Description of Related Art

Original digital documents, which may include text, graphics, images, etc., are often printed, and the printed hard copy are distributed, copied, etc., and then often scanned back into digital form. Authenticating a scanned digital document refers to determining whether the scanned document is an authentic copy of the original digital document, i.e., whether the document has been altered while it was in the hard copy form. Alteration may occur due to deliberate effort or accidental events. Authentication of a document in a closed-loop process refers to generating a printed document that carries authentication information on the document itself, and authenticating the scanned-back document using the authentication information extracted from the scanned document. Such a printed document is said to be self-authenticating because no information other than what is on the printed document is required to authenticate its content.

Methods have been proposed to generate self-authenticating documents using barcode, in particular, two-dimensional (2d) barcode. Specifically, such methods include processing the content of the document (bitmap image, text, graphics, etc.) and converting it into authentication data which is a representation of the document content, encoding the authentication data in a 2d barcode (the authentication barcode), and printing the barcode on the same recording medium as the printed document. This results in a self-authenticating document. To authenticate such a printed document, the document is scanned to obtain scanned data that represents the content of the document, e.g. a bitmap image, text extracted by using an optical character recognition (OCR) technology, etc. The authentication barcode is also scanned and the authentication data contained therein is extracted. The scanned data is then compared to the authentication data to determine if any part of the printed document has been altered, i.e. whether the document is authentic. Some authentication technologies are able to determine what is altered, some merely determine whether any alterations have occurred.

Methods of authenticating a document using 2d barcode are described in commonly owned U.S. patent application Ser. Nos. 12/050,701 and 12/050,718, both filed on Mar. 18, 2008.

To generate barcodes that encode the content of the document, different types of content in the document are often treated differently. Text content may be encoded as text strings. Image content, which tends to be large in data size, is typically down-sampled and compressed to reduce its size before it is coded in barcode. Thus, the authentication data stored in the barcode that represent image content typically has a lower resolution than the original image data in the document.

Within a document, there are often areas containing critical content, such as signatures. In conventional document authentication techniques, a signature is typically treated as an image, i.e., the signature image is down-samples and compressed and them coded in barcode. Thus, during the authentication step, the signature image extracted from the barcode on the scanned document often has poor quality, and the comparison of the extracted signature image with the signature on the scanned document can be unreliable.

SUMMARY

Accordingly, the present invention is directed to a document authentication method that substantially obviates one or more of the problems due to limitations and disadvantages of the related art.

An object of the present invention is to provide a method of generating a self-authenticating document that preserves critical content such as signatures in high quality data, and a related method of authenticating such a document.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method of generating reliable self-authenticating document and document authentication, which includes: (a) obtaining a first digital document; (b) generating a second digital document from the first digital document, including: (b1) segmenting the first digital document to extract at least one segment containing critical content and at least one segment containing a non-critical image, the non-critical image including a plurality of pixels; (b2) processing the critical content to generate a bit string of processed data; and (b3) modifying the non-critical image to embed the bit string in it, wherein each data bit of the bit string is embedded into predetermined low bits of one or more pixels of the non-critical image; wherein the second digital document includes the segment containing the critical content and the segment containing the non-critical image which has been modified, and (c) printing or storing the second digital document.

Step (b) above may further include (b4) calculating a hash code from the bit string of processed data using a hash function; and (b5) encoding the hash code in barcode, wherein the second digital document further includes the barcode.

The method may further include: (d) scanning the printed document to generate a third digital document; (e) analyzing the third digital document to determine whether it is authentic, including: (e1) segmenting the third digital document to extract at least the segment containing the critical content and the segment containing the non-critical image which has been modified; (e2) recovering the bit string embedded in the non-critical image; (e3) processing the recovered bit string to obtain re-generated critical content; and (e4) comparing the re-generated critical content with the critical content obtained in step (e1) to determined whether they are substantially identical, wherein if they are not substantially identical, the third digital document is determined to be not authentic; and (f) displaying or storing a result indicating whether the third digital document is authentic.

Step (e) may further includes: (e5) identifying the barcode in the third digital document and extracting the hash code encoded therein; (e6) calculating a hash code from the recovered bit string using the hash function; and (e7) comparing the calculated hash code with the hash code extracted from the barcode to determine if they are identical, wherein if they are not identical, the third digital document is determined to be not authentic.

In another aspect, the present invention provides a document authentication method which includes: (a) obtaining a digital document, the digital image having been generated by scanning a printed document, the printed document containing at least one segment containing critical content and at least one segment containing a non-critical image, the non-critical image having a bit string embedded therein, the bit string having been generated by processing the critical content; (b) analyzing the digital document to determine whether it is authentic, including: (b1) segmenting the digital document to extract at least the segment containing the critical content and the segment containing the non-critical image; (b2) recovering the bit string embedded in the non-critical image; (b3) processing the recovered bit string to obtain re-generated critical content; and (b4) comparing the re-generated critical content with the critical content obtained in step (b1) to determined whether they are substantially identical, wherein if they are not substantially identical, the digital document is determined to be not authentic; and (f) displaying or storing a result indicating whether the digital document is authentic.

The printed document may further contain a barcode having a hash code coded therein, the hash code having been calculated from the bit string using a hash function, wherein step (b) may further includes: (b5) identifying the barcode in the digital document and extracting the hash code encoded therein; (b6) calculating a hash code from the recovered bit string using the hash function; and (b7) comparing the calculated hash code with the hash code extracted from the barcode to determine if they are identical, wherein if they are not identical, the digital document is determined to be not authentic.

In another aspect, the present invention provides computer program products that cause a data processing apparatus to perform the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide an improved document authentication method in which critical content, such as signatures in the document, is preserved at a high-resolution in the authentication data carried on the document.

In conventional document authentication methods, the size of the authentication barcode stamps is typically not sufficient to store authentication data at high resolution. As described earlier, conventional document authentication methods typically perform down-sampling of image data in order to convert it to authentication data to be stored in barcode. For certain critical content, such as signatures, down-sampling often leads to unsatisfactory authentication results.

According to embodiments of the present invention, when generating authentication data, critical contents such as signatures is processed without down-sampling, or down-sampled at a relatively high sampling rate, and compressed with relatively low compression ratio to preserve the resolution and quality of the information. Rather than storing it in the barcode, the authentication data for the critical content is embedded in the images on the document, e.g., stored in the low bits of the image pixels. Relatively large amount of authentication data can be embedded in the images. To increase security, a hash code is generated for the authentication data for the critical content, and stored in the barcode.

Figure 1:
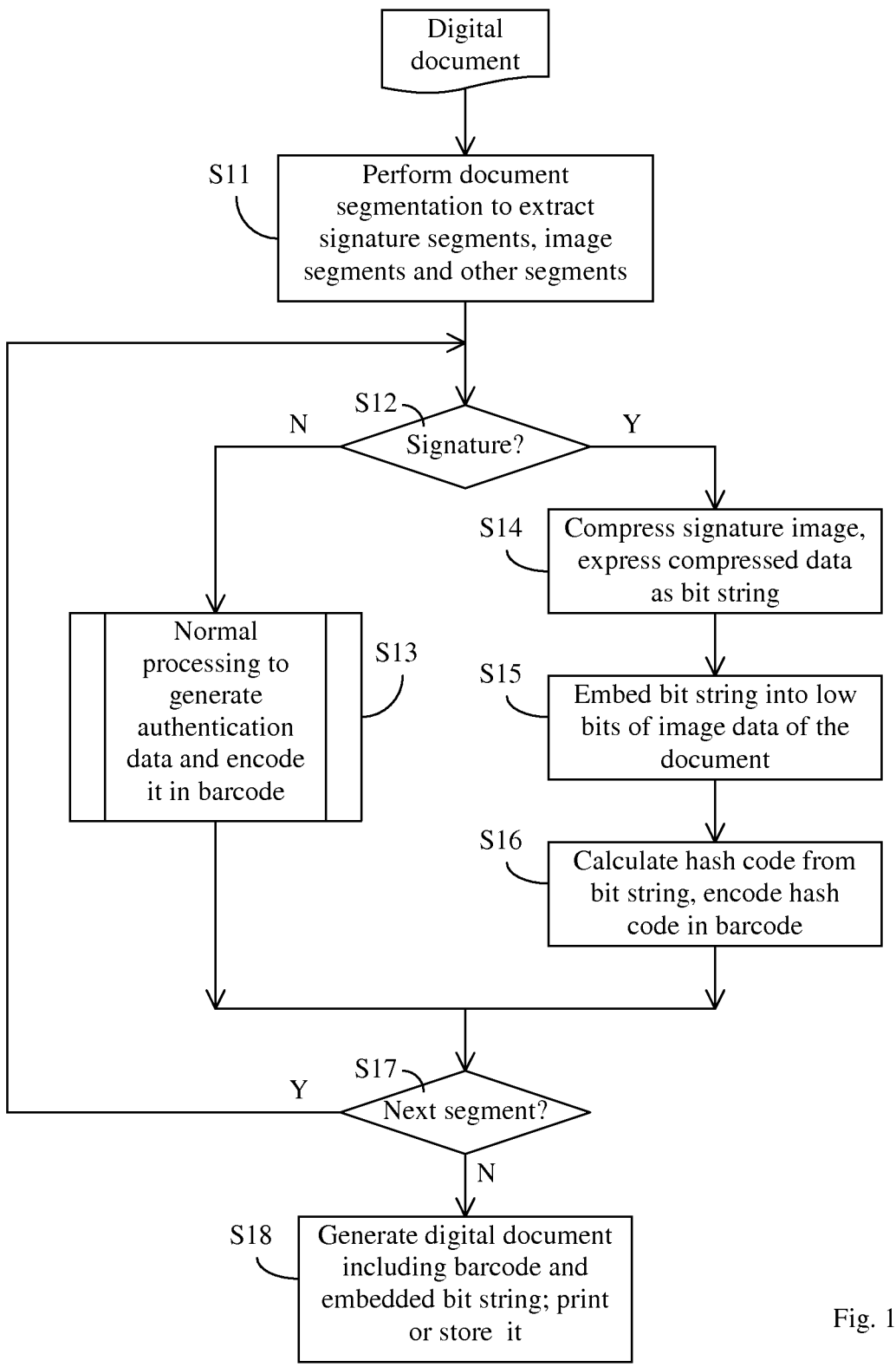
FIG. 1 is a flow diagram illustrating a process of generating a self-authenticating document according to an embodiment of the present invention.
Figure 2:
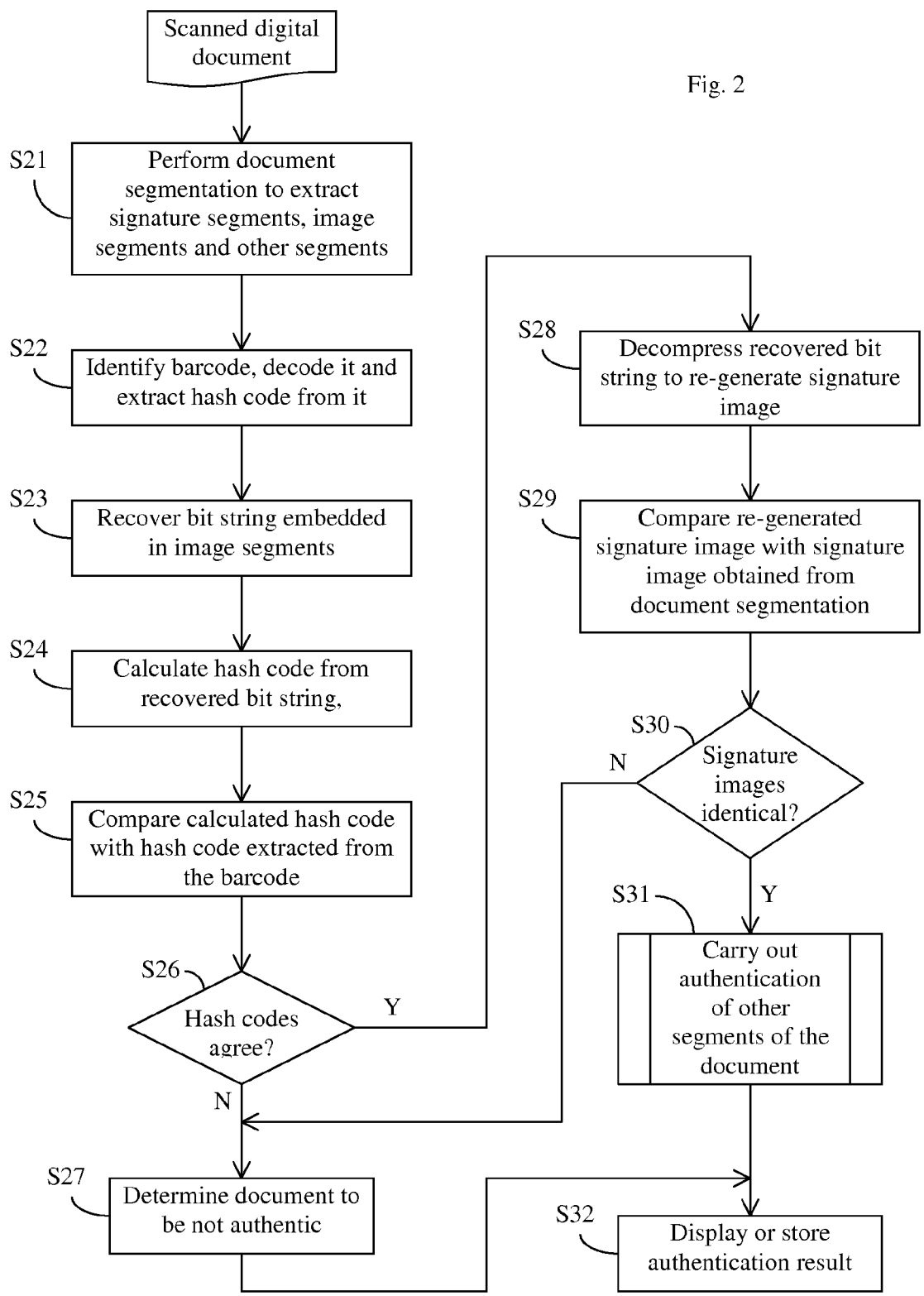
FIG. 2 is a flow diagram illustrating a process of authenticating the document after it is printed and scanned back according to an embodiment of the present invention.

The document self-authentication method is described in more detail with reference to FIGS. 1 and 2. FIG. 1 is a flow diagram illustrating a process of generating a self-authenticating document. FIG. 2 is a flow diagram illustrating a process of authenticating the document after it is printed, circulated, and then scanned back.

Referring to FIG. 1, the digital document is first segmented into multiple segments (step S11), each segment containing, for example, a paragraph of text, a line of text, a graphics object, an image object, a signature, etc. Techniques for segmenting a document are known in the art, and any suitable such technique may be used. A signature is a bitmap image by nature, but it can be distinguished from non-signature images by the fact that a signature primarily contains lines of substantially uniform line width, rather than extended black or gray areas as found in non-signature images, and/or the fact that a signature image typically have a relatively lower image density. As used in this disclosure, the term "image" refers to a non-signature image unless indicated otherwise. Thus, step S11 includes a step of distinguishing a signature from a non-signature image and separate out signature segments. All non-signature segments (text, graphics, image, etc.) are processed in a normal, conventional process to generate authentication data and encode it in barcode (step S13). This process may include optical-character recognition, down-sampling of images, compression, etc.

If the segment is a signature segment ("Y" in step S12), the signature image is compressed, without down-sampling, and the compressed data is expressed as a bit string (step S14). The bit string constitutes the authentication data of the signature segment. Any suitable compression method may be used, such as JPEG, etc. Then, the bit string of the compressed signature image is embedded in one or more image objects of the document (step S15). Various methods of embedding the bit string into the images may be used. In a preferred embodiment, each bit of the bit string is embedded in the lower bits of an n by m block of pixels of the image. Using an n by m block helps to reduce noise when the bit string is recovered from the scanned-back document. In order to embed the bits, the image must have multi-bit pixel values with a sufficient number of bits, such as 8 bits. If the pixel values of the original image in the document have insufficient number of bits, the pixel values are converted so that they have a sufficient number of bits. For example, if the original image is black and white, the pixel values may be converted from binary values 0 and 1 to 8-bit values 16 and 255. To embed the data bit into the low bits of a pixel, one or more predetermined low bits of the pixel value are modified in a way depending on the value of the data bit being embedded. The predetermined low bits may be the lowest three bits, the lowest four bits, etc., depending on the quality (gray scale resolution, noise level, etc.) of the printer and scanner used to print and scan back the document.

In one embodiment, the image used to embed the bit string is a black and white image expressed as 8-bit pixel values, where the pixel value is 255 for a white pixel and 16 for a black pixel. If the data bit to be embedded is 0, the resulting pixel value after embedding the data bit is 255 for a white pixel and 16 for a black pixel. If the data bit to be embedded is 1, the resulting pixel value after embedding the data bit is 239 for a white pixel and 0 for a black pixel. In the resulting image, black areas of the image may become slightly less black (a dark gray), and white areas of the image may become slightly gray. Of course, the above is only one example; other ways of embedding a data bit into a pixel value may be used, which can be easily designed by those skilled in the art. The image used to embed the bit string may also be a gray scale image, although the resulting bit string data extracted from the scanned back image may be less stable.

In one embodiment, the values of n and m are 2 and 2, respectively. The larger the n and m values, the larger the image that is needed to embed a bit string, but the lower the noise in the scanned-back image for recovering the bit string. In one example, if an image segment is 2 cm by 2 cm in size, and the scan is performed at 600 dpi (dots per inch) resolution, the image segment will contain about 472 by 472 pixels. If the compressed bit string for a signature is about 1 KB (8k bits), and each data bit is embedded into a 2 by 2 block of pixels (n=2, m=2), then about 32 k (32768) pixels will be needed to embed one signature. Thus, about 6 to 7 signatures can be embedded in a 2 cm by 2 cm image segment of the document.

Referring again to FIG. 1, a hash code is calculated from the bit string of compressed signature data, using a suitable hash function (preferably a cryptographic hash function), and coded in the barcode (step S16). The hash code is relatively small in size, i.e., 128 bits, 256 bits, etc. The purpose of the hash code is to determine, during authentication (see FIG. 2), whether the bit string embedded in the image has been altered. The use of the hash code is optional, but it increases the security of the authentication method. It can help eliminate the possibility that both the signature and the image that embeds the signature are replaced or removed. In addition, administrative information, such as the locations of the image segments where bit strings are embedded, the embedding algorithm, etc., may also be encoded in the barcode.

Once all segments of the document have been processed ("N" in step S17), a digital document that includes the authentication barcode and some modified image segments that embed the bit string of compressed signature data, i.e. the self-authenticating document, is generated (step S18). The digital document is printed or store for later printing (step S18).

In the process shown in FIG. 1, the order of steps S15 and S16 is not important. Moreover, although steps S13 and S16 each is shown to include encoding data in barcode, the step of generating barcode data may be performed in one step after all segments in the document are processed.

Referring now to FIG. 2, to authenticate a self-authenticating document that has been printed and then scanned back, the scanned digital document is segmented into multiple segments (step S21), each segment containing, for example, a paragraph of text, a line of text, a graphics object, an image object, a signature, etc. This step is similar to step S11 in FIG. 1. The barcode in the document is identified and decoded, and the hash code is extracted from the barcode (step S22). Information regarding the locations of the image segments where the bit string of the compressed signature data is embedded is also extracted from the barcode in this step. Any other information contained in the barcode is also extracted and used as appropriate. Techniques for identifying barcode in a scanned document are well known.

Then, the image segments where the bit string of compressed signature data is embedded are analyzed to recover the embedded bit string (step S23). It should be noted that the document is scanned back using a gray scale scan with sufficient gray scale depth and resolution. Recovering the embedded bits from the image pixels can be considered a reverse process of the embedding process. For example, using the exemplary embedding method given earlier, if the pixel value of a pixel in the scanned image is approximately 255 or 16, then the embedded data bit is 0; if the pixel value is approximately 239 or 0, then the embedded data bit is 1. The bit string recovered in step S23 represents the compressed signature image. From the recovered bit string, a hash code is calculates using the same hash function that was used when the self-authenticating document was generated (step S24). The hash code calculated in step S24 is compared to the hash code extracted from the barcode to determine whether image segments, and hence the embedded bit string, had been altered before the document was scanned back (step S25). If the two hash codes are different, the document is determined to have been altered (i.e. not authentic) (step S27). The authentication result may be displayed to a user or stored and the process terminates (step S32).

If the two hash codes are the same, the process continues to the next step. The bit string that represents the compressed signature image is decompressed to re-generate the signature image (step S28). The re-generated signature image is compared to the signature image segment obtained from the document segmentation step S21 to determine if the two images are substantially identical (step S29). Techniques for comparing two images are known in the art, and any suitable such comparison technique may be used. Different techniques may have different criteria for determining whether the two images are substantially identical, as they are not likely to be exactly identical due to noise and other factors. If the two signature images are not substantially identical ("N" in step S30), the document is determined to have been altered (i.e. not authentic) (step S27 and step S32). If the two signature images are substantially identical ("Y" in step S30), the process continues to authenticate other segments of the document (e.g. text, images, graphics, etc.) (step S31). The final result of the authentication determination may be displayed to a user or stored (step S32).

In the process shown in FIG. 2, the order of the various steps is generally not important. For example, steps S24-S26 may be performed after steps S28-S30. The signature is determined to be authentic if both comparisons S25 and S29 are done and the answers in both steps S26 and S30 are Yes. Moreover, as mentioned earlier, the hash code is an optional security feature. If a hash code is not used, steps S22, S24, S25 and S26 are omitted.

The description above uses signatures as the critical content. More generally, the method can be used to encode any critical content by embedding a bit string representing the critical content into a non-cortical image segment.

The methods described above are implemented in a data processing system which includes a computer, and optionally a printer, scanner and/or a printer/scanner/copier "all-in-one" device connected to the computer. The first process of generating a self-authenticating digital document (the process of FIG. 1) and the second process of authenticating a scanned digital document (the process of FIG. 2) can be carried out on different computers. Each process can be carried out on a computer with or without a printer or scanner attached to the computer; the computer that carries out the first process can store the digital document it generates and send the document to another computer for printing, and the computer that carries out the second process can receive a scanned document to be authenticated from another computer. The process can also be implemented on a printer or scanner that has suitable processing power. The processes are preferably implemented as software or firmware.

It will be apparent to those skilled in the art that various modification and variations can be made in the document authentication method and related apparatus of the present invention without departing from the spirit or scope of the invention. Thus, it is intended that the present invention cover modifications and variations that come within the scope of the appended claims and their equivalents.

What is claimed is:

1. A document authentication method comprising:
   (a) obtaining a first digital document;
   (b) generating a second digital document from the first digital document, including:
      (b1) segmenting the first digital document to extract at least one segment containing critical content and at least one segment containing a non-critical image, the non-critical image including a plurality of pixels;
      (b2) processing the critical content to generate a bit string of processed data;
      (b3) modifying the non-critical image to embed the bit string in it, wherein each data bit of the bit string is embedded into predetermined low bits of one or more pixels of the modified non-critical image;
      (b4) calculating a hash code from the bit string of processed data using a hash function; and
      (b5) encoding the hash code in barcode;
      wherein the second digital document includes the segment containing the critical content, the segment containing the non-critical image which has been modified, and the barcode;
   (c) printing the second digital document to produce a printed document;
   (d) scanning the printed document to generate a third digital document;
   (e) analyzing the third digital document to determine whether it is authentic, including:
      (e1) segmenting the third digital document to extract at least the segment containing the critical content and the segment containing the non-critical image which has been modified;
      (e2) recovering the bit string embedded in the non-critical image;
      (e3) processing the recovered bit string to obtain re-generated critical content;
      (e4) comparing the re-generated critical content with the critical content obtained in step (e1) to determined whether they are substantially identical, wherein if they are not substantially identical, the third digital document is determined to be not authentic;
      (e5) identifying the barcode in the third digital document and extracting the hash code encoded therein;
      (e6) obtaining a hash code from the recovered bit string; and
      (e7) comparing the hash code obtained in step (e6) with the hash code extracted from the barcode to determine if they are identical, wherein if they are not identical, the third digital document is determined to be not authentic; and
   (f) displaying or storing a result indicating whether the third digital document is authentic.

2. The method of claim 1, wherein the critical content includes one or more signature images.

3. The method of claim 2, wherein the recovered bit string represents compressed signature images, and wherein step (e3) includes decompressing the bit string.

4. The method of claim 1, wherein step (b2) includes compressing the critical content.

5. The method of claim 1, wherein in step (b1) the non-critical image segmented from the first digital document have binary pixel values,
   wherein step (b3) includes converting the binary pixel values from binary values 0 or 1 to 8-bit values 16 or 255, and modifying the pixel value to 0 and 239 if the data bit to be embedded is 1.

6. The method of claim 1,
   wherein step (b1) further includes extracting additional segments containing document content, and
   wherein step (b) further includes:
      (b6) processing the segment containing the non-critical image and the additional segments to generate authentication data; and
      (b7) encoding the authentication data in the barcode.

7. The method of claim 1, wherein step (e6) includes calculating the hash code from the recovered bit string using the hash function.

8. A document authentication method comprising:
   (a) obtaining a digital document, the digital image having been generated by scanning a printed document, the printed document containing at least one segment containing critical content and at least one segment containing a non-critical image, the non-critical image having a bit string embedded therein, the bit string having been generated by processing the critical content, the printed document further containing a barcode having a hash code coded therein, the hash code having been calculated from the bit string using a hash function;
   (b) analyzing the digital document to determine whether it is authentic, including:
      (b1) segmenting the digital document to extract at least the segment containing the critical content and the segment containing the non-critical image;
      (b2) recovering the bit string embedded in the non-critical image;
      (b3) processing the recovered bit string to obtain re-generates critical content;
      (b4) comparing the re-generated critical content with the critical content obtained in step (b1) to determined whether they are substantially identical, wherein if they are not substantially identical, the digital document is determined to be not authentic;
      (b5) identifying the barcode in the digital document and extracting the hash code encoded therein;
      (b6) obtaining a hash code from the recovered bit string; and
      (b7) comparing the hash code obtained in step (b6) with the hash code extracted from the barcode to determine if they are identical, wherein if they are not identical, the digital document is determined to be not authentic; and
   (c) displaying or storing a result indicating whether the digital document is authentic.

9. The method of claim 8, wherein the critical content includes one or more signature images.

10. The method of claim 9, wherein the recovered bit string represents compressed signature images, and wherein step (b3) includes decompressing the bit string.

11. The method of claim 8, wherein step (b6) includes calculating the hash code from the recovered bit string using the hash function.

12. A computer program product comprising a computer usable non-transitory medium having a computer readable program code embedded therein for controlling a data processing apparatus, the computer readable program code configured to cause the data processing apparatus to execute a document authentication process, the process comprising:
  (a) obtaining a first digital document;
  (b) generating a second digital document from the first digital document, including:
    (b1) segmenting the first digital document to extract at least one segment containing critical content and at least one segment containing a non-critical image, the non-critical image including a plurality of pixels;
    (b2) processing the critical content to generate a bit string of processed data;
    (b3) modifying the non-critical image to embed the bit string in it, wherein each data bit of the bit string is embedded into predetermined low bits of one or more pixels of the modified non-critical image;
    (b4) calculating a hash code from the bit string of processed data using a hash function; and
    (b5) encoding the hash code in barcode,
    wherein the second digital document includes the segment containing the critical content, the segment containing the non-critical image which has been modified, and the barcode;
  (c) printing the second digital document to produce a printed document;
  (d) scanning the printed document to generate a third digital document;
  (e) analyzing the third digital document to determine whether it is authentic, including:
    (e1) segmenting the third digital document to extract at least the segment containing the critical content and the segment containing the non-critical image which has been modified;
    (e2) recovering the bit string embedded in the non-critical image;
    (e3) processing the recovered bit string to obtain re-generated critical content;
    (e4) comparing the re-generated critical content with the critical content obtained in step (e1) to determined whether they are substantially identical, wherein if they are not substantially identical, the third digital document is determined to be not authentic;
    (e5) identifying the barcode in the third digital document and extracting the hash code encoded therein;
    (e6) obtaining a hash code from the recovered bit string; and
    (e7) comparing the hash code obtained in step (e6) with the hash code extracted from the barcode to determine if they are identical, wherein if they are not identical, the third digital document is determined to be not authentic; and
  (f) displaying or storing a result indicating whether the third digital document is authentic.

13. The computer program product of claim 12, wherein step (b2) includes compressing the critical content.

14. The computer program product of claim 12, wherein in step (b1) the non-critical image segmented from the first digital document have binary pixel values, wherein step (b3) includes converting the binary pixel values from binary values 0 or 1 to 8-bit values 16 or 255, and modifying the pixel value to 0 and 239 if the data bit to be embedded is 1.

15. The computer program product of claim 12,
  wherein step (b1) further includes extracting additional segments containing document content, and
  wherein step (b) further includes:
    (b6) processing the segment containing the non-critical image and the additional segments to generate authentication data; and
    (b7) encoding the authentication data in the barcode.

16. The computer program product of claim 12, wherein the critical content includes one or more signature images.

17. The computer program product of claim 16, wherein the recovered bit string represents compressed signature images, and wherein step (e3) includes decompressing the bit string.

18. The computer program product of claim 12, wherein step (e6) includes calculating the hash code from the recovered bit string using the hash function.

19. A computer program product comprising a computer usable non-transitory medium having a computer readable program code embedded therein for controlling a data processing apparatus, the computer readable program code configured to cause the data processing apparatus to execute a process for authenticating a digital document, the process comprising:
  (a) obtaining a digital document, the digital image having been generated by scanning a printed document, the printed document containing at least one segment containing critical content and at least one segment containing a non-critical image, the non-critical image having a bit string embedded therein, the bit string having been generated by processing the critical content, the printed document further containing a barcode having a hash code coded therein, the hash code having been calculated from the bit string using a hash function;
  (b) analyzing the digital document to determine whether it is authentic, including:
    (b1) segmenting the digital document to extract at least the segment containing the critical content and the segment containing the non-critical image;
    (b2) recovering the bit string embedded in the non-critical image;
    (b3) processing the recovered bit string to obtain re-generates critical content;
    (b4) comparing the re-generated critical content with the critical content obtained in step (b1) to determined whether they are substantially identical, wherein if they are not substantially identical, the digital document is determined to be not authentic;
    (b5) identifying the barcode in the digital document and extracting the hash code encoded therein;
    (b6) obtaining a hash code from the recovered bit string; and
    (b7) comparing the hash code obtained in step (b6) with the hash code extracted from the barcode to determine if they are identical, wherein if they are not identical, the digital document is determined to be not authentic; and
  (c) displaying or storing a result indicating whether the digital document is authentic.

20. The computer program product of claim 19, wherein the critical content includes one or more signature images.

21. The computer program product of claim 20, wherein the recovered bit string represents compressed signature images, and wherein step (b3) includes decompressing the bit string.

22. The computer program product of claim 19, wherein step (b6) includes calculating the hash code from the recovered bit string using the hash function.

* * * * *